No. 770,385.

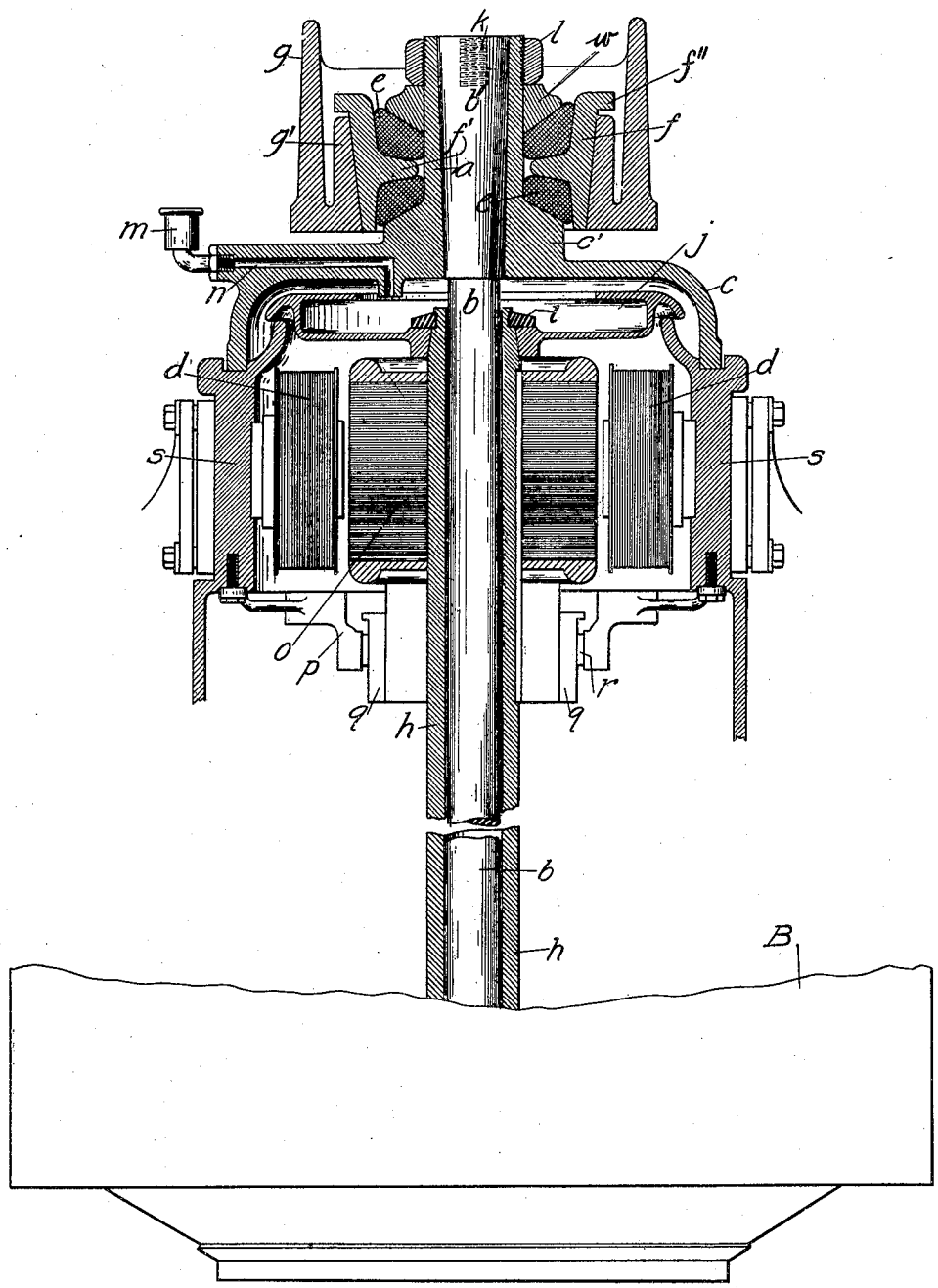

Patented September 20, 1904.

UNITED STATES PATENT OFFICE.

GIDEON POTT AND ROBERT WILLIAMSON, OF MOTHERWELL, SCOTLAND.

CENTRIFUGAL MACHINE.

SPECIFICATION forming part of Letters Patent No. 770,385, dated September 20, 1904.

Application filed November 24, 1902. Serial No. 132,600. (No model.)

*To all whom it may concern:*

Be it known that we, GIDEON POTT and ROBERT WILLIAMSON, subjects of the King of the United Kingdom of Great Britain and Ireland, both residing at Motherwell, in the county of Lanark, Scotland, have invented certain new and useful Improvements in Centrifugal Machines, of which the following is a specification.

Our invention relates to centrifugal machines, and more especially to the suspension and driving means.

Our invention relates to a suspension for centrifugal machines wherein the fixed shaft which supports the centrifugal and driving motor may be removed without the necessity for disassembling the entire apparatus.

Our invention comprises means for suspending and driving centrifugal machines, whereby the centrifugal machine may gyrate or deflect while in operation, the suspension means including a fixed shaft, which may be removed or withdrawn from its surrounding hollow shaft, upon which is secured the centrifugal basket and the rotating element of the driving-motor.

The object of our invention is the provision of improved means in the suspension of centrifugal machines, especially in the multi-spindle arrangement. In the usual two-spindle or two-shaft suspension the bearing is at the lower end of the internal fixed shaft, this bearing taking the entire weight of the driving-motor and centrifugal. It is desirable to remove the internal fixed spindle for the purpose of adjusting or repairing this lower bearing and for other purposes, and to this end the structure herein shown and described lends itself most advantageously.

The accompanying drawing is a view, partly in section and partly in elevation, of the suspension and driving means.

Referring to the drawing, $g$ is a hanger secured to or supported by girders or any other fixed object. This hanger has the inner portion $g'$, whose bore is tapered, the smaller diameter being at the lower side.

$f$ is a ring member whose external surface is machined and turned to a taper complementary to the taper bore of $g'$.

$f'$ is an inwardly-extending portion of the ring $f$ and constitutes a dividing plate or diaphragm.

$f'$ is an overhanging flange of the ring member $f$, serving as means for readily grasping or securing the ring member $f$ when it is desired to raise the same out of its tapered socket for removing, $e\ e$, which represent annular masses of rubber or other resilient material confined between the diaphragm $f'$ and the shoulder portion $c'$ and the washer $w$, respectively. The shoulder portion $c'$, integral with the casing member $c$, continues upwardly in the cylindrical or sleeve portion $a$, whose bore is turned to a taper, converging toward the bottom to receive the tapering enlargement $b'$ on the upper end of the internal fixed spindle or shaft $b$, which extends vertically downward and has at its lower end the usual bearing for supporting the centrifugal basket B, which is secured to the hollow shaft $h$, which surrounds the fixed shaft or spindle $b$.

$l$ is a nut engaging on the upper end of the portion $a$. By screwing the nut $l$ downwardly the washer $w$ is forced downwardly against the upper ring $e$ of rubber, and thus also draws up the shoulder portion $c'$ against the lower ring $e$ of rubber.

$k$ is a screw-threaded hole in the upper end of the shaft $b$, adapted to receive an eyebolt or equivalent means, whereby the inner shaft $b$ may be withdrawn upwardly without disturbing the remainder of the apparatus, which is simply supported or blocked in position for such withdrawal. It is to be noticed that the inner shaft $b$ is smaller in diameter than any portion of the head member $b'$, thus permitting the withdrawal of the entire shaft $b$.

The casing $c$ serves to support the field-ring, as inside of which are supported the field-windings and poles $d$ of an electric motor whose armature $o$ is secured by key or otherwise to the rotating shaft $h$.

$p$ represents the brush-holders, $r$ the brushes, and $q$ the commutator of the motor.

$j$ represents an oil reservoir or receiver, secured to the rotating shaft $h$ by means of the nut $i$.

$m$ is an oil cup or funnel communicating with the duct $n$, formed in the casing member $c$. The inner terminal of this duct is directed downwardly, so as to direct the lubricant into the receiver $j$. From here the lubricant passes down between the inner spindle $b$ and the outward rotating spindle $h$, a guiding bearing or bushing being provided, if desired, on the inside of the hollow spindle $h$ at its upper end. The field-magnets being rigidly secured to the casing $c$, whose position is invariable with regard to the fixed spindle $b$, and the armature $o$ being always concentric with the inner spindle $b$, it follows that the fixed and rotatable elements of the electric motor maintain their concentric relation with respect to each other irrespective of the gyratory motion of motor and centrifugal which is permitted by the resiliency of the rubber rings $e$ $e$. The weight of centrifugal basket and driving-motor is borne by the diaphragm $f'$, formed on the ring member $f$, and through the member $f$ the weight is transferred to the hanger member $g$. The tendency to deflection or gyration is opposed by the rubber rings $e$ $e$, which are compressed as the shaft $d$ moves out of its vertical position.

The inner shaft $b$ is held against rotation by any suitable means, such as set-screw or key. In some cases, however, it will be found that the friction between the washer $w$ and the portion $c'$ and the rubber rings $e$ $e$ will be sufficient to prevent the rotation of the casing $c$ and that there will be sufficient friction between the tapered portion $b'$ and the sleeve $a$ to hold the shaft $b$ fixed with regard to the casing $c$.

What we claim is—

1. In combination, a shaft, a member having a sleeve, said shaft having an enlargement engaging in said sleeve, and resilient material surrounding said sleeve and supporting said member.

2. In combination, a hanger, a member supported by said hanger, resilient material opposing the deflection of said member, a sleeve on said member having a socket therein, and a fixed shaft having an enlargement engaging in said socket.

3. In combination, a hanger, a member having tapered socket engagement with said hanger, resilient material supported by said member, a sleeved member supported by said resilient material, and a fixed shaft having an enlarged portion having tapered socket engagement with said sleeved member.

4. In combination, a fixed shaft, having a tapering enlargement at the upper end, a member having a tapering socket for receiving said enlargement, a hanger, and resilient material intermediate said hanger and member for supporting said member and permitting the deflection of said shaft.

5. In a suspension for centrifugal machines, a hanger, a member supported by said hanger and capable of deflection, a fixed shaft supported by said hanger, and having an enlargement at the upper end engaging in said member, whereby said shaft may be withdrawn upwardly through said member.

6. In a suspension for centrifugal machines, a hanger, a member supported by said hanger, a fixed shaft having an enlargement at the upper end engaging in said member, whereby said shaft may be withdrawn upwardly through said member, and means permitting the deflection of said shaft.

7. In a suspension for centrifugal machines, a hanger, a member having tapering engagement with said hanger, a fixed supporting-shaft supported by said member, means for permitting the deflection of said supporting-shaft, and resilient means opposing the deflection of said shaft.

8. In a suspension for centrifugal machines, a hanger, a fixed shaft having portions of different diameters and supported by said hanger at a portion having the largest diameter, whereby said shaft may be withdrawn upwardly through said hanger.

9. In a suspension for centrifugal machines, a hanger, an annular member having tapering socket engagement with said hanger, and a fixed shaft supported by said annular member and removable through said annular member.

In witness whereof we have hereunto set our hands in presence of two witnesses.

GIDEON POTT.
ROBERT WILLIAMSON.

Witnesses:
　WALLACE CRANSTON FAIRWEATHER,
　JNO. ARMSTRONG, Jr.